United States Patent

[11] 3,630,689

| [72] | Inventors | Dennis A. Wheeler;<br>Henry F. Irving; David B. Todd, all of<br>Saginaw, Mich. |
|---|---|---|
| [21] | Appl. No. | 872,701 |
| [22] | Filed | Oct. 30, 1969 |
| [45] | Patented | Dec. 28, 1971 |
| [73] | Assignee | Baker Perkins Inc.<br>Saginaw, Mich. |

[54] APPARATUS FOR REACTING AND DEVOLATILIZING PREPOLYMER AND LIKE MATERIALS
27 Claims, 6 Drawing Figs.

[52] U.S. Cl. ............................................. 23/285,
18/12 SP, 18/12 SS, 259/6, 259/104, 260/75 M
[51] Int. Cl. ....................................... B01f 15/02,
B01j 1/00, C08g 17/00
[50] Field of Search .......................................... 23/285,
252; 259/6, 104; 260/75 M; 18/12 SP, 12 SN, 12 SS, 30 AS

[56] References Cited
UNITED STATES PATENTS

| 2,048,286 | 7/1936 | Pease | 23/252 UX |
|---|---|---|---|
| 2,170,303 | 8/1939 | Helstrup | 23/252 UX |
| 3,343,922 | 9/1967 | Zimmer et al. | 23/285 |
| 3,387,826 | 6/1968 | Loomans | 259/104 X |
| 3,446,485 | 5/1969 | Fischer | 259/6 |
| 3,522,214 | 7/1970 | Crawford et al. | 23/285 X |

*Primary Examiner*—Joseph Scovronek
*Attorney*—Learman, Learman & McCulloch

ABSTRACT: Multiscrew, corotating mixer shafts extend axially in a barrel and sets of interwiping self-cleaning lobular paddles or mixing elements on the shafts continuously wipe the barrel and primarily effect a radial as distinguished from an axial mixing. In the mixing zone, the lobes of the paddle portions are aligned over the length of the stage, so that axially continuous flow paths and vapor disengagement spaces are provided to a vapor drawoff vacuum duct situated at the material charging end of the barrel. The mixing stage is separated from a product discharge stage by dam means. In the mixing stage a predetermined amount of material is supplied to the barrel which is maintained only partly full of the material which is fed continuously through the machine. Preferably the paddle sections are lens shaped in cross section and interwiping paddle sections on a pair of shafts are disposed at right angles to one another.

INVENTORS
DENNIS A. WHEELER
HENRY F. IRVING
DAVID B. TODD

BY

Learman, Learman & ...

INVENTORS
DENNIS A. WHEELER
HENRY F. IRVING
DAVID B. TODD

BY
Learman, Learman & McCulloch

INVENTORS
DENNIS A. WHEELER
HENRY F. IRVING
DAVID B. TODD

BY

APPARATUS FOR REACTING AND DEVOLATILIZING PREPOLYMER AND LIKE MATERIALS

One of the prime objects of the present invention is to provide an improved continuous method and apparatus useful, for example, for carrying out reaction and devolatilization processes such as polycondensation. For example, the removal of low molecular weight polymers and other gaseous materials from molten plastic material such as the polyesters, polystyrenes and polyamides is contemplated. In addition, the machine to be described is useful as an evaporator of water or solvents from pasty materials such as filter cakes, to the removal of vaporous reaction products generally, and to the incorporation of trace materials such as dyes, perfumes, catalysts, and inhibitors into the product to control or enhance the product immediately prior to discharge.

A further object of the present invention is to provide a continuous mixer for the purposes indicated which is designed to produce maximum mixing in a radial direction and minimum mixing in an axial direction. The mixer to be described provides excellent surface renewal in the mixing operation while limiting axial dispersion and is operable at relatively higher throughput rates than have been achieved previously.

Another object of the invention is to design a mixer or reactor for the purposes identified which is efficient in operation, and is completely self-cleaning.

A further object of the invention is to provide substantially continuous vapor disengagement spaces in the mixing stage of the machine which communicate substantially directly with a vapor extraction system removed from the mixing stage. The invention has found particular utility in the polycondensation of polyethylene terephthalate prepolymers wherein glycol is to be removed.

Still a further object of the invention is to provide an apparatus and methods of the character described wherein elongate beads of material are continually formed in a mixing stage of the operation which are then peripherally smeared to obtain a maximum vapor releasing film surface exposure for reacting purposes, the high-shear mixing to be described providing a surface area generation much greater than previously achieved.

A further object of the invention is to provide a process useful for the purposes described which permits a faster processing of material but provides the uniform "residence" time in the reactor necessary to the achievement of uniform reaction results in the material being processed.

A still further object of the invention is to provide a reactor of the character described wherein the problem of material degradation and consequent product contamination as a result of the movement of material up into vapor removal tubes or the like is avoided in a machine achieving substantially only radial mixing.

Other objects and advantages of the invention will become apparent following reference to the accompanying drawings wherein.

Referring now more particularly to the accompanying drawings, the structure selected for illustration of the invention includes a base 10 for supporting a mixer housing generally designated H to which the prepolymer material, or other material, is fed and in which the polycondensation or similar reaction occurs.

Figure 1:
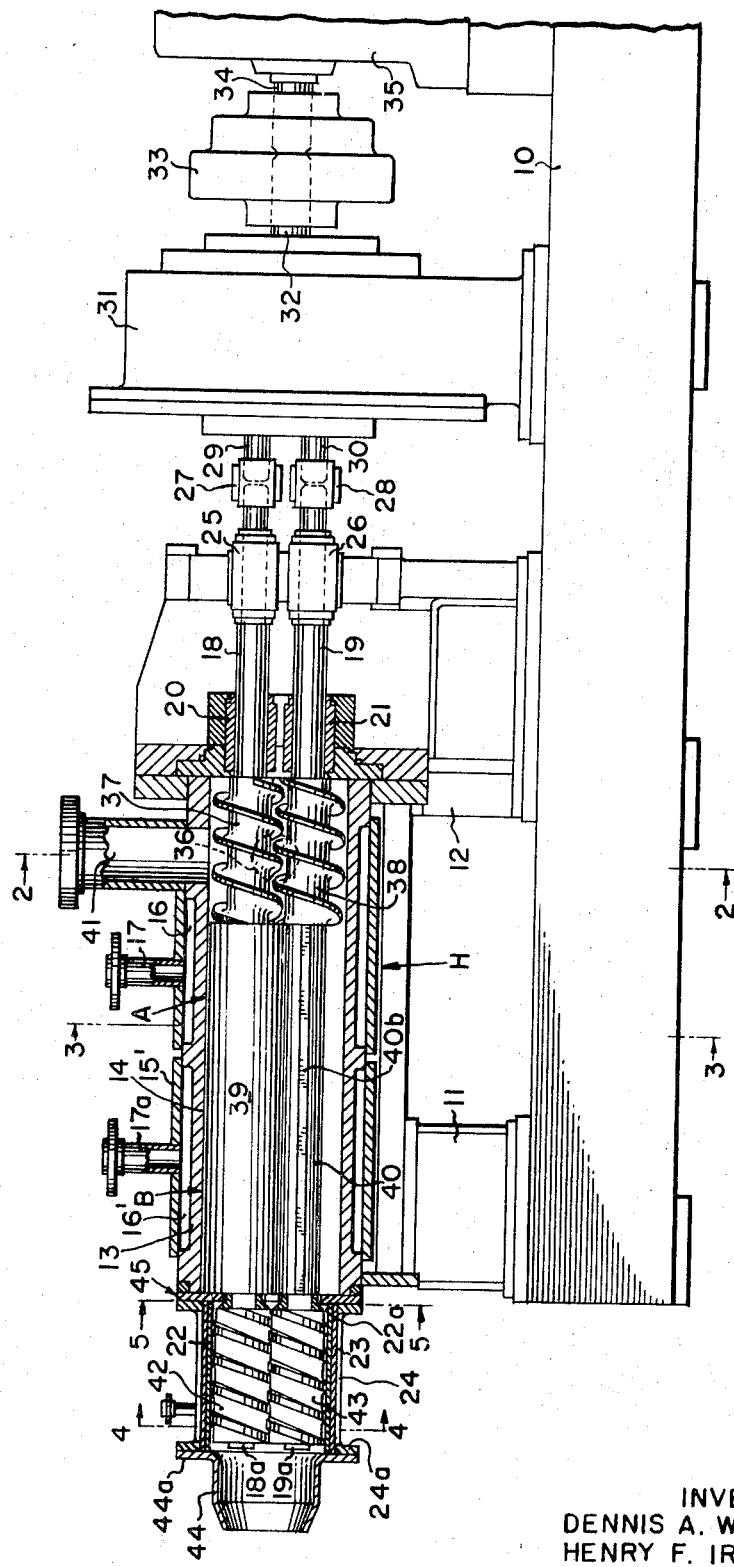
FIG. 1 is a partly sectional side elevational view of our mixer or reactor.
Figure 3:
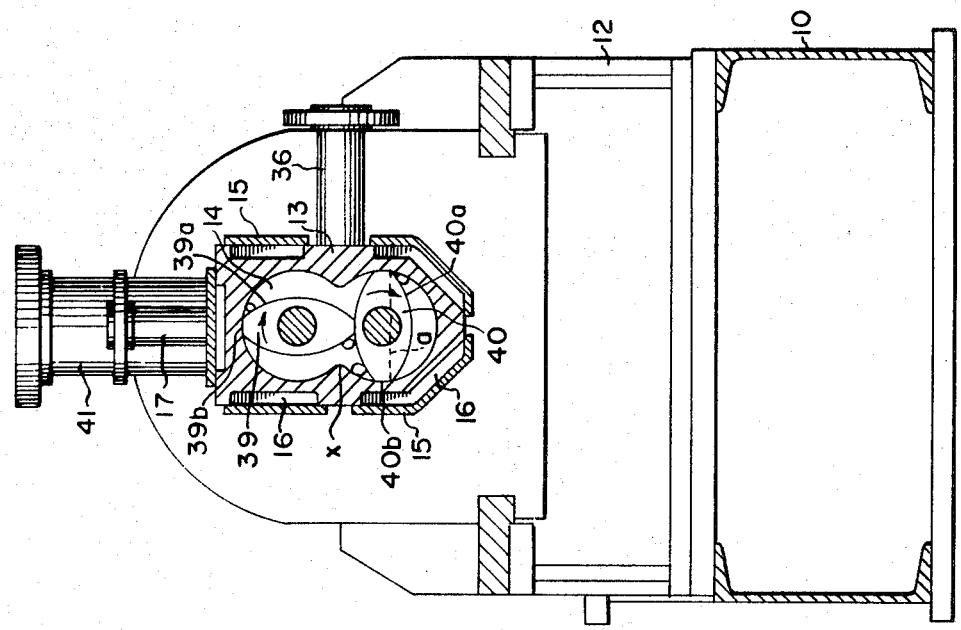
FIG. 3 is a similar view taken on the line 3—3 of FIG. 1; and depicting the machine in operation, the paddle sections being shown forming the axially extending cylinders of material in the mixing stage.
Figure 2:
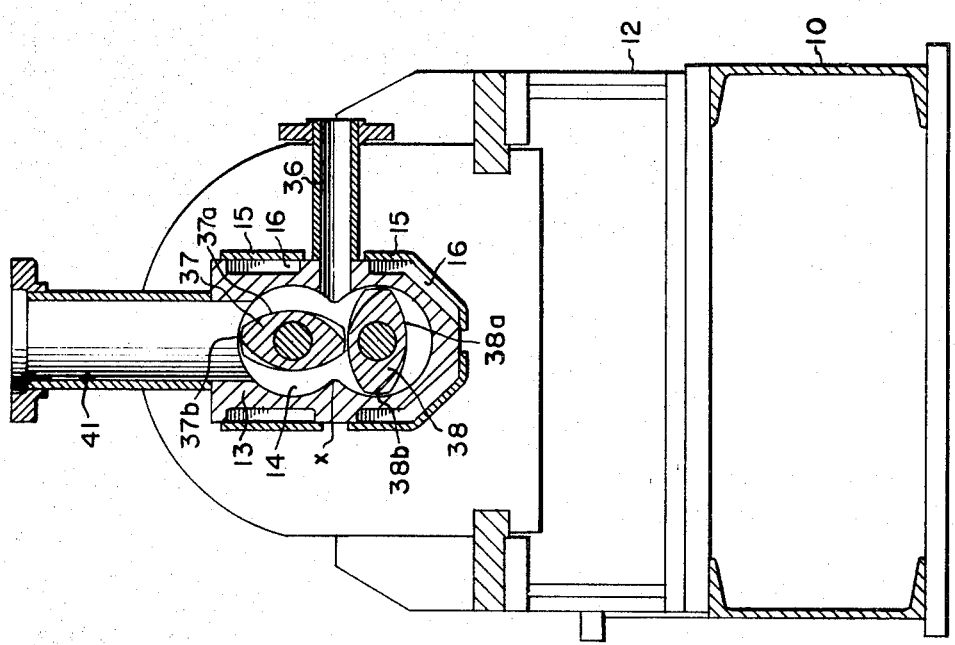
FIG. 2 is an enlarged, transverse sectional view taken on the line 2—2 of FIG. 1.
Figure 4:
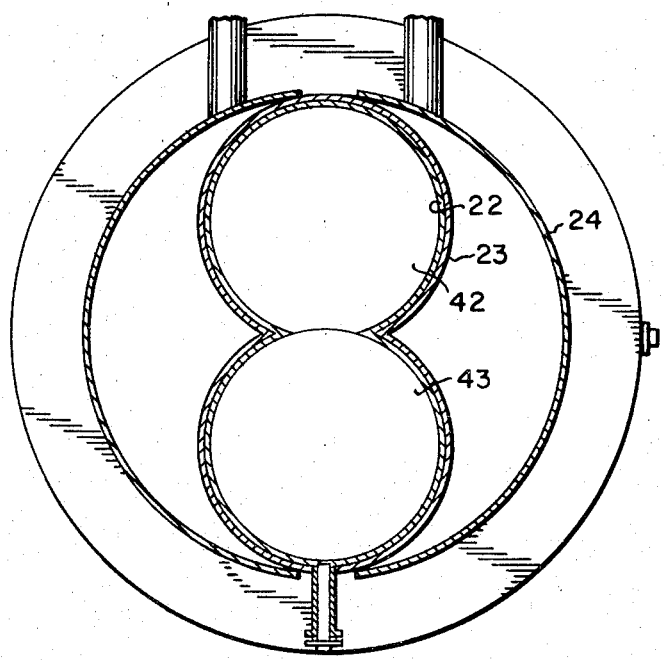
FIG. 4 is a still further enlarged transverse sectional view taken on the line 4—4 of FIG. 1.

As FIGS. 1-3 particularly indicate, the mixer housing H is mounted on pedestal supports 11 and 12 and comprises a jacketed barrel 13 having a figure eight shaped chamber 14 therein. Jackets 15 and 15' are provided for temperature controlling fluids circulating through chambers 16 and 16' which surround the chamber 14. It is to be understood that temperature controlling fluids, which may suitably comprise liquids such as water, are pumped through the chambers 16 and 16' in the conventional manner.

In the machine illustrated two temperature controlled zones A and B are maintained, and chamber 16 is a material heating chamber while chamber 16' is a material cooling chamber. Separate circulating fluid inlets and outlets are provided for the chambers 16 and 16' which may be of the character of the inlets 17 and 17a provided in FIG. 1, for example.

Supported for rotation in a common direction in the horizontal barrel 13 are a pair of axially extending mixer shafts 18 and 19 respectively, which are journaled at their rear ends in suitable bearings 20 and 21 and at their front ends by a suitable barrel sleeve 22, provided within a barrel extension 23 of slightly reduced size, but of the same figure eight configuration. The barrel 23 is supported within a casing 24 which is secured to the stationary, longitudinally disposed barrel 13 in a manner which will be presently described. The shafts 18 and 19, which are also journaled at their rear ends in additional bearings 25 and 26, are coupled as at 27 and 28 to the output shafts 29 and 30, respectively, of the drive transmission gearbox 31 which has its input shaft 32 coupled as at 33 to the armature shaft 34 of a suitable drive motor 35. Thus, shafts 18 and 19 are driven in a conventional manner by a conventional electrical motor, and it is to be understood that they are driven in the same direction of rotation at a predetermined speed which typically may be in the range of 60-190 revolutions per minute.

Provided at the right or charge end of the apparatus, as it is shown in FIG. 3, is a material inlet tube 36 which continuously supplies the viscous prepolymer or other material to the machine. The size of the delivery tube 36 is gauged so that, when maintained full of continuously supplied material, it supplies sufficient material to the chamber 14 so that the void space is maintained about 30 percent full in terms of volume. If the machine and material were at rest the material would reach the level indicated by the line a. It is to be understood that the chamber 14 is under vacuum but, of course, with the inlet pipe 36 maintained full of prepolymer at all times, a liquid seal is achieved at tube 36. Mounted on each of the shafts 18 and 19 are intermeshing advancing screw sections 37 and 38 respectively. As FIG. 2 indicates, the cross-sectional configuration of the sections 37 and 38 is lenticular, the screw sections essentially providing arcuate flank profile surfaces 37a and 38a connected at their converging ends by arcuate crest portions 37b and 38b. The portions of chamber 14 occupied by the threaded sections 37 and 38 may be termed the material advancing zone of the mixer.

Provided immediately ahead of the advancing or forwarding screw sections 37 and 38 are lenticular paddle sections 39 and 40 which similarly have flank sections 39a and 40a respectively, joined at their ends by crest sections 39b and 40b. It will be observed that the lobes of each of the respective paddle sections 39 and 40 are in linear axial alignment, as distinguished from progressive helical arrangement. The portion of chamber 14 occupied by the paddle sections 39 and 40 constitutes the mixing or reacting zone. The crest portions 37b, 38b, 39b, and 40b not only wipe the respective flank sections 37a, 38a, 39a, and 40a but also completely wipe the interior wall of chamber 14 as illustrated in FIGS. 2 and 3. As will later become apparent, the material within chamber 14 is continually smeared against the flanks 37a–40a and the interior wall of chamber 14 and peeled therefrom in the mixing stage. The material which is peeled off by the paddle sections 39 and 40 is formed into cylindrical beads which extend the length of the mixing stage and then are again smeared out as a thin film about 1 millimeter in thickness on the interior wall of chamber 14 or on a paddle section 39 or 40. If the material being reacted is polyethylene terephthalate prepolymer, glycol and unreacted monomers are given off in the form of a vapor in the mixing stage described and proceed along the continuous flow paths provided between the paddle lobes to a removal duct 41 which has a cross-sectional area equal to the cross-sectional area of the chamber 14 so that there is no substantial pressure drop. Due to the maintenance of the continuous flow paths, there are no impediments to a free vapor flow through the mixing stage. The removal duct 41 is situated just over the advancing screw sections 37 and 38 so that the vapor need move only a quarter turn around the screw threads to reach it and the vapor flow paths may be said to be substantially unimpeded. By providing a vacuum removal duct 41 connected to a suitable vacuum system connected with a source of vacuum, such as a conventional vacuum pump, and providing virtually free flow paths to the duct 41, it is possible to avoid the use of vacuum ducts in the mixing zone which would tend to fill up with degradating and contaminating material. Thus, the need for using screw-type mixing sections in the mixing zone so that material will not be driven up into vacuum tubes is obviated and paddle portions can be utilized which achieve a peripheral mixing without any substantial axial mixing. Because the ducts 41 are substantially of the cross-sectional area of chamber 40, and vapor flow is not impeded, full suction forces are available to move the vapor to be discharged rapidly and efficiently out of the reacting zone.

Figure 5:
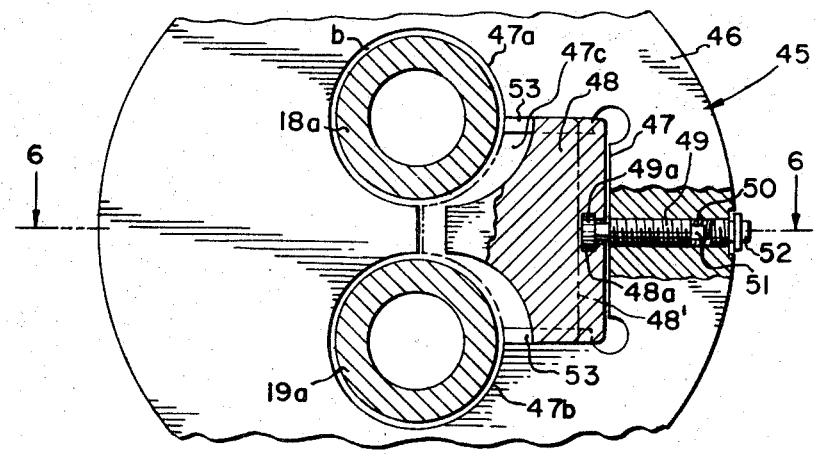
FIG. 5 is a similar view taken on the line 5—5 of FIG. 1.
Figure 6:
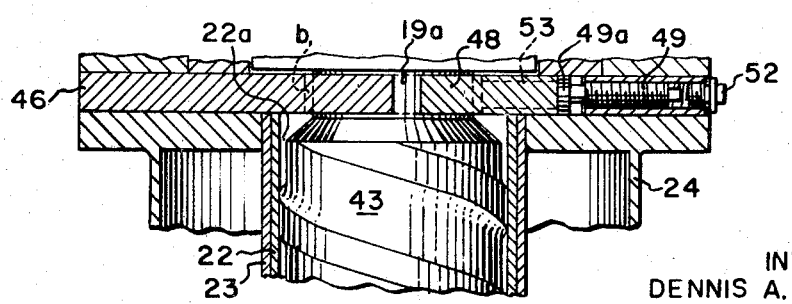

As FIG. 1 and FIGS. 5 and 6 particularly indicate, the shafts 18 and 19 include reduced terminal end sections 18a and 19a on which discharge screw sections of circular cross section 42 and 43 are fixed. As previously indicated, the land portions of screw sections 42 and 43 have a bearing clearance with the bearing sleeve 22 which supports the shafts 18 and 19 at their extreme forward ends. An axial material discharge housing 44 has a flange 44a permitting it to be readily secured to the casing 24 which is provided with a support flange 24a to which flange 44a may be removably fixed in any acceptable manner.

As FIGS. 1, 5, and 6 particularly illustrate, the discharge screw chamber 22a is of somewhat reduced cross-sectional area relative to chamber 14 although of the same figure eight configuration. A dam assembly generally indicated at 45 and providing a variable discharge outlet is mounted between the chamber 14 and chamber 22a. The dam controls the peripheral spill-out of the beads formed in the chamber 14, while at the same time providing an independent control over the "reaction" time of the material in the mixing zone over and beyond the speed at which shafts 18 and 19 are driven.

The assembly 45 includes a stationary plate of circular cross section 46, stationarily secured between flanges on the casing 24 and barrel 13, in which a reduced size material passing opening 47 is provided. The opening 47 comprises generally circular opening portions 47a and 47b in axial alignment with the axis of shafts 18 and 19 and of a size to pass the reduced shaft sections 18a and 19a without passing any substantial amounts of material. Only a minimum amount of material is free to pass through the reduced passages b around the shafts 18a and 19a. As shown in FIG. 5, at one side the opening portions 47a and 47b are connected by an enlarged dam receiving opening portion 47c in which a dam member 48 is radially adjustable, as shown, from the wide open position shown in FIG. 5 in solid lines to the completely closed position illustrated by the broken lines at 48' in the same figure. The dam member 48 includes a radially extending adjusting bolt 49 threadably received in a threaded passage 50 provided in the plate 46 and having a square or hexagonal head 51 which may be gripped to turn the bolt 49 and move the dam member 48 radially inwardly or outwardly. The bolt 49 has an enlarged cylindrical end 49a rotatably received in an undercut slot 48a provided in the dam member 48. Thus, bolt 49, while freely rotatably relative to the dam plate 48, will move it radially inwardly and outwardly relative to opening portions 47a and 47b when bolt 49 is gripped and rotated by a suitable tool. The passage 50 may be closed in the manner indicated in FIG. 5 by a suitable cap screw 52. Provided on the edges of the opening portion 47c, as shown, are undercut ways 53 which receive and guide the dam plate 48.

THE OPERATION

In operation, material such as polyethylene terephthalate prepolymer, which may comprise polyethylene terephthalate of DP about 50, is fed continuously to the machine through the inlet 36 for the purpose of carrying out a polycondensation reaction. The rate of feed of the viscous material is gauged such that it corresponds to the rate that the twin advancing screws 37 and 38 will move the material forwardly for the purpose of minimizing mixing of the material in screw sections 37 and 38.

In the case of polyethylene terephthalate prepolymer, the chamber 16 circulates fluid which heats the material from the entry temperature to a temperature of about 590° F. which is just below the deterioration temperature of the material, but which is well above its melting point. The channel 16' removes the heat added to the material by mixing or working it and maintains it at the same temperature. Moreover, the material which enters the machine at a temperature just above its melting point (500° F.) is not raised to a reacting temperature until it encounters paddle sections 39 and 40. It should be well understood that axial mixing of the product is to be avoided as nearly as possible because the polycondensation reaction to be performed requires that all of the feed material have approximately the same reaction time in the mixer. Otherwise, there will be too broad a molecular weight distribution spread of the final product.

In the case of the polyethylene terephthalate prepolymer and, when paddle sections 39 and 40 of lenticular configuration are utilized, only enough material to occupy the available space in chamber 14 about 30 percent by volume is fed to the system. If the paddle sections used have three or more lobular portions and are generally triangular in cross section, the amount of material fed to the mixer is about 10–20 percent of the available volume. In twin shaft mixers of the type illustrated, the tip or crest of each paddle wipes not only the barrel wall, but also the other paddle. If the barrel was operating filled with material, the mixing action would occur because the tips or crests of the paddle would knead and smear material against the wall and each other, and also, because there would be a volumetric displacement of material alternating between the two generally cylindrical halves of the barrel. For example, twice, during each revolution, the upper paddle in FIG. 3 would be completely in the upper portion of the chamber, while the cooperating lower paddle would be only partly within its original half chamber and vice versa. Thus, the cross-sectional area available for fluid or material in the respective half chamber is constantly oscillating, and this oscillating action causes some axial mixing over and above the radial mixing occurring at the paddle tips. We have discovered that by restricting the amount of material fed to the machine, the effect of the volumetric displacement of material is minimized and axial dispersion of the material is limited. As the amount of material available to fill the void space is decreased, the volumetric displacement between barrel halves contributes less to axial mixing. In the mixing stage, the material in excess of the material which is smeared on the chamber 14 walls or paddle sections in the form of a thin film, is carried in the form of cylindrical rolled beads of an axial length equal to the length of paddle sections 39 and 40, which are transferred from paddle to paddle at the barrel saddle points illustrated at x in FIGS. 2 and 3. These beads are smeared to provide a maximum area of vapor releasing surface and then reformed in the manner previously indicated, and the transfer between the rolling beads and the wiped film is excellent.

The system provides optimum surface renewal for carrying on the polycondensation reaction and, without pressure drop, effectively removes the vaporous byproducts by virtue of the continuous and virtually free vapor flow paths which have also previously been mentioned. The vacuum range maintained in the reactor is 0.05–1.0 torr. In the case of the polyethylene terephthalate prepolymer, the vapor removed will, of course, be principally glycol.

From the paddle sections 39 and 40, the rolls of material peripherally spill out to the portions of opening 47c not occupied by the dam member 48 and also proceed through the passages b to the discharge screw chamber 22a. The dam is used to control bead height. The material will normally completely fill the chamber 22a, and will be discharged out the discharge housing 44 under a predetermined pressure at a temperature of about 500° F., coolant being circulated through the chamber 23. By predetermining the proper position of the dam member 48 for the material being processed, the "holdup" or "retention" time of the material in the chamber 14, can be varied without, however, varying the uniformity of reaction time of the material.

While we have primarily referred to polyethylene terephthalate prepolymer, it is to be understood that other reactions with other materials may also be carried out. Various polyesters and polyamides may be processed in a similar manner. In the case of a polyamide polycondensation reaction, the vapor given off will be primarily water, along with unreacted vaporous monomers.

It is also to be understood that in place of the twin discharge screw housing 22a downstream from the dam plate 45, an identical second mixing stage with paddle sections 39 and 40 on the shafts 18 and 19 could be substituted. A suitable discharge screw assembly or other discharge device identical to that described, would then be connected with the end of the second mixing stage or final polycondensation reaction and an identical dam assembly would be used between the second mixing stage and discharge assembly. In this manner, a different vacuum could be maintained in the second mixing stage than is maintained in the first one. As in the first described embodiment of the invention the material discharge pressure created by pumping screw sections 42 and 43 is greater than atmospheric and the discharge may be accomplished through a suitable forming device such as the nozzle shown or a conventional die.

Finally, while superposed shafts 18 and 19 are shown, it should be understood they can be side by side and may be so disposed in a preferred form of the invention. Moreover, they may be tubular and a temperature affecting fluid may be continuously circulated therethrough. The following are various examples specifying process parameters for various materials.

EXAMPLE I

Polyethylene terephthalate prepolymer with an 0.38 intrinsic viscosity was fed to the continuous polycondensation reactor at 18 lbs./hr. at 518° F. The reactor was operated with a first jacket zone temperature of 600° F. and a second zone jacket temperature of 530° F. at 60 r.p.m. rotor speed and 0.18 torr. Product polyester of good color and excellent properties was produced with an 0.63 intrinsic viscosity.

EXAMPLE II

Polyamide prepolymer with an 0.31 intrinsic viscosity was fed to the continuous polycondensation reactor at 30 lbs./hr. at 499° F. The reactor was operated with a jacket zone temperature of 548° F., at 180 r.p.m. rotor speed and 0.3 torr. Product polyamide of good color was produced with an 0.54 intrinsic viscosity.

We claim:

1. Continuous mixer-reactor apparatus for handling materials giving off a vapor to be removed comprising: a barrel providing a sealed mixing compartment except for inlet means and outlet means spaced downstream therefrom, corotating mixer shafts extending axially in said barrel; means for supplying material to be mixed to said barrel inlet means; intermeshed advancing screw sections for said shafts disposed to receive said material and advance it to said mixing compartment; continuously cowiping, radially engaged paddle sections for said shafts downstream from said screw sections; said compartment being entirely of a shape generated by said paddle sections as they rotate with said shafts so that said mixing compartment is continuously wiped; said paddle sections having lobular portions, extending axially in linear extension from said screw sections to the downstream end of the mixing compartment to smear material upon the walls of said compartment, providing continuous, axial flow paths for vapor within said compartment, between said lobular portions; vacuum duct means communicating with said barrel at said screw sections to remove said vapor; and means for driving said shafts.

2. The combination defined in claim 1 in which a barrel extension, having a chamber of lesser cross-sectional area and axially aligned with said compartment, receives material discharged from said compartment; said shafts extending axially into said chamber and having intermeshing, screw sections thereon which also wipe the walls of said chamber; and a discharge portion for said barrel extension out which processed material is discharged.

3. The combination defined in claim 2 in which a dam assembly is provided between said mixing compartment and chamber and includes a radially movable dam member for varying the flow from the mixing compartment to said chamber.

4. The combination defined in claim 3 in which said dam assembly includes a partition plate having spaced-apart through bores for said shafts and a bore portion connecting said bores; said dam comprising a plate movable to a position to close the said bore portion.

5. The combination defined in claim 4 in which said mixing compartment and chamber are both of figure eight configuration in cross section and said bores are concentric with the cylindrical portions thereof; and said dam plate is configured to provide a radially inwardly projecting neck with curvilinear sidewalls shaped to correspond with said bores movable from an outer open position to a position in which the sidewalls align with said bore walls and said neck closes the bore portion between said bores.

6. The combination defined in claim 5 in which said neck terminates in a plate portion and ways are provided in said portion plate to slidably receive said plate portion.

7. The combination defined in claim 6 in which said bores are of slightly greater diameter than necessary to pass said shafts to form material-passing passages therearound in addition to the bore portion which may not be closed by said dam plate.

8. The combination defined in claim 7 in which a tapering portion on said shafts disposed in said chamber just upstream from the screw portions therein leads material radially.

9. Continuous mixer apparatus for materials giving off a vaporous product comprising: a barrel providing a mixing compartment closed except for spaced-apart inlet and outlet means for respectively admitting and discharging material thereto; corotating mixer shafts extending axially in said barrel; radially interwiping paddle sections on and rotating with said shafts configured to also wipe the entire perimetral surface of the mixing compartment; said compartment being entirely of a shape generated by said paddle sections as they rotate with said shafts; said paddle sections comprising lobular portions extending axially in linear extension to provide linear axial flow paths for vapor through said paddle sections; a vacuum source for removing vapor out an end of the compartment; means for supplying material to said inlet means and for discharging it from said outlet means at a rate to only partially radially occupy the free space in said compartment as it is moved therethrough, and to occupy it such that linear axial cylinders of material extending generally the length of said compartment are continuously formed in said compartment by said paddle sections; and means for driving said shafts.

10. The combination defined in claim 9 wherein radially adjustable dam means is provided at the discharge end of said mixing compartment to maintain the desired volume of material therein.

11. The combination defined in claim 10 wherein intermeshing screws, provided in a chamber which they also completely wipe, receive material from said mixing compartment around said dam means.

12. The combination defined in claim 10 in which said dam means is movable to a position to tangentially control the path of the material and pass it to said screws in a proper flow path.

13. The combination defined in claim 9 in which said mixing compartment has a charge end with cowiping material advancing portions therein leading to said paddle sections; and vacuum duct means communicating with said charge end at the downstream end of said material advancing portions and so communicating substantially directly with said vapor flow paths.

14. The combination defined in claim 9 in which said barrel is jacketed and includes heating jacket means around the charge end of the mixing compartment to raise the temperature of the material and cooling jacket means downstream thereof to remove heat from the material.

15. The combination defined in claim 2 in which said barrel is jacketed and includes a heating jacket for the inlet end of the mixing compartment to raise the temperature of the material, and a cooling jacket downstream thereof to remove a predetermined degree of heat from the material.

16. The combination defined in claim 15 in which said barrel extension is also jacketed in the region of said cowiping screw sections.

17. The combination defined in claim 10 in which said dam means discharges to a second mixing compartment into which said shafts extend; radially interwiping paddle sections on said shafts within said second compartment configured to also wipe the perimetral surface of the mixing compartment; said latter paddle sections also comprising lobular portions extending axially in linear extension to provide linear axial flow paths for vapor through said paddle sections; a discharge section is connected with said second compartment; and second damming means is provided at the discharge end of the second mixing compartment to maintain the desired volume of material therein.

18. The combination defined in claim 9 in which said shafts are driven in the same direction of rotation and at the same speed.

19. Continuous mixer apparatus for materials giving off a vaporous product comprising: a barrel providing a perimetrally closed material smearing compartment having spaced-apart inlet and outlet means for respectively admitting and discharging material thereto; corotating shafts extending axially in said barrel; radially interwiping paddle sections on and rotating with said shafts configured to also wipe the entire perimetral surface of the compartment; said closed compartment being entirely of a shape generated by said paddle sections as they rotate with said shafts so that material may be smeared anywhere on the perimetral surface thereof; said paddle sections comprising lobular portions, extending in an axial direction in a manner to provide continuous and uninterrupted axially leading vapor flow paths through said paddle sections, from one end of said compartment to the other, for vapor and to achieve substantially peripheral as distinguished from axial mixing of the material; a vacuum source for removing vapor from an end of the compartment; means for supplying material to said inlet means and discharging it from said outlet means at a rate to only partially radially occupy the free space in said compartment as material is moved therethrough such that linear axial cylinders of material extending generally the length of said compartment can be continuously formed and reformed in said compartment by said paddle sections and smeared thereby on said surface; and means for driving said shafts.

20. The combination defined in claim 19 in which said paddle sections are of generally lenticular configuration and said mixing compartment is generally of figure eight shape.

21. The combination defined in claim 19 in which advancing screw sections are provided on said mixer shafts upstream from said paddle sections; and said means for supplying material to said inlet means supplies it at a rate gauged to the pitch of said screw sections such that substantially no mixing occurs in said screw sections which serve principally to advance said material.

22. The combination defined in claim 19 in which a discharge chamber, provided in communication with said mixing compartment, is reduced considerably in cross-sectional area relative thereto and has discharge screw means therein receiving the material from said outlet means, the available space in said chamber being such that said discharge chamber remains fully occupied by material.

23. The combination defined in claim 22 in which a radially adjustable member movable radially inwardly and outwardly provides an adjustable orifice between the discharge chamber and said compartment.

24. The combination defined in claim 22 in which said discharge chamber is of generally the same cross-sectional configuration as said compartment.

25. The combination defined in claim 21 in which said vacuum source communicates with said barrel at said advancing screw sections.

26. The combination defined in claim 19, in which means is provided for heating the material from the temperature at which it is received by the advancing screws, at which it is nonreactive, to a temperature at which it is reactive in the mixing compartment.

27. The combination defined in claim 19 in which said paddle sections comprise linearly axially extending lobes of uniform cross-sectional shape throughout their length.

* * * * *